United States Patent
Gulliver et al.

(10) Patent No.: US 9,576,300 B2
(45) Date of Patent: Feb. 21, 2017

(54) SYSTEM AND METHOD FOR WIRELESS SOFTWARE DOWNLOAD AND REMOTE TRANSACTION SETTLEMENT

(75) Inventors: Christopher Alan Gulliver, Escondido, CA (US); Masaki Takemura, San Diego, CA (US); Russell Paik, Poway, CA (US)

(73) Assignees: SONY CORPORATION, Tokyo (JP); SONY ELECTRONIC INC., Park Ridge, NJ (US)

( * ) Notice: Subject to any disclaimer, the term of this patent is extended or adjusted under 35 U.S.C. 154(b) by 1247 days.

(21) Appl. No.: 12/550,634

(22) Filed: Aug. 31, 2009

(65) Prior Publication Data

US 2009/0319393 A1 Dec. 24, 2009

Related U.S. Application Data

(63) Continuation-in-part of application No. 10/243,634, filed on Sep. 13, 2002, now Pat. No. 7,603,406.

(60) Provisional application No. 60/399,075, filed on Jul. 25, 2002, provisional application No. 60/408,965, filed on Sep. 4, 2002.

(51) Int. Cl.
| | |
|---|---|
| *G06Q 30/00* | (2012.01) |
| *G06Q 30/02* | (2012.01) |
| *G06Q 20/34* | (2012.01) |
| *G06Q 30/06* | (2012.01) |
| *G07F 7/10* | (2006.01) |
| *G07F 17/00* | (2006.01) |
| *G07F 17/16* | (2006.01) |

(52) U.S. Cl.
CPC ........ *G06Q 30/0267* (2013.01); *G06Q 20/346* (2013.01); *G06Q 30/0268* (2013.01); *G06Q 30/06* (2013.01); *G06Q 30/0601* (2013.01); *G06Q 30/0603* (2013.01); *G07F 7/1008* (2013.01); *G07F 17/0014* (2013.01); *G07F 17/16* (2013.01)

(58) Field of Classification Search
CPC ............ G06Q 30/0267; G06Q 30/0268; G06Q 20/346; G06Q 30/06; G06Q 30/0601; G06Q 30/0603; G07F 7/1008; G07F 17/0014; G07F 17/16
USPC ...................................................... 705/26, 27
See application file for complete search history.

(56) References Cited

U.S. PATENT DOCUMENTS 6,009,525 A * 12/1999 Horstmann ...................... 726/22
6,363,356 B1 * 3/2002 Horstmann .................. 705/26.7
(Continued)

FOREIGN PATENT DOCUMENTS

WO 00/79818 12/2000

OTHER PUBLICATIONS

"Download the Latest DVD Release Right to Your Vehicle? Delphi First to Publicly Demonstrate How; Delphi Shows How 802.11a and 802.11b Will Enhance Mobile Entertainment, Information and Commerce," PR Newswire, Jan. 8, 2002.*

*Primary Examiner* — Anne Georgalas
(74) *Attorney, Agent, or Firm* — John L. Rogitz

(57) ABSTRACT

A portable computer in a store can be carried past a kiosk and wirelessly receive from the kiosk demonstration versions of software, along with an ID of the store. Later, after using the demonstration version, the user can access a Web server and purchase a full version of the software. During the transaction, the store ID is provided to the server, which can then credit the particular store at which the demonstration version was obtained with a sale.

16 Claims, 1 Drawing Sheet

(56) References Cited

U.S. PATENT DOCUMENTS

| | | | |
|---|---|---|---|
| 6,529,992 B1* | 3/2003 | Thomas et al. | 711/1 |
| 6,587,835 B1* | 7/2003 | Treyz et al. | 705/14.64 |
| 6,697,944 B1* | 2/2004 | Jones | G06F 21/10 |
| | | | 705/50 |
| 6,959,285 B2* | 10/2005 | Stefanik et al. | 705/27.1 |
| 2002/0010759 A1* | 1/2002 | Hitson et al. | 709/219 |
| 2002/0069354 A1* | 6/2002 | Fallon et al. | 713/2 |

* cited by examiner

SYSTEM AND METHOD FOR WIRELESS SOFTWARE DOWNLOAD AND REMOTE TRANSACTION SETTLEMENT

RELATED APPLICATIONS

This application is a continuation of allowed U.S. patent application Ser. No. 10/243,634, filed Sep. 13, 2002, now U.S. Pat. No 7,603,406, incorporated herein by reference, from which priority is claimed, which in turn claims priority from U.S. provisional application Ser. No. 60/339,075, filed Jul. 25, 2002, and from U.S. provisional application Ser. No. 60/408,965, filed Sep. 4, 2002, both of which are incorporated herein by reference and from both of which is priority claimed.

I. FIELD OF THE INVENTION

The present invention relates generally to wireless software downloads.

II. BACKGROUND OF THE INVENTION

Software typically is sold in retail stores like other products, packaged in boxes that are placed on shelves for consumers to buy. Like the sale of other products, this entails the need for sales personnel, customer service, and the allocation of precious shelf space, all of which add to the overhead of the sale.

The present invention understands that software can be provided using kiosks. A consumer can place a portable computing device such as a personal digital assistant (PDA) near or on the kiosk and select one or more software titles desired by the consumer. Then, the kiosk can wirelessly beam the selected software to the PDA. In this way, floor space is conserved, since the software need not be boxed and placed on shelves, and sales personnel need not be involved with the transaction.

The present invention further recognizes, however, that it is often the case that a consumer desires to try out software before purchasing it, and accordingly that a seller may desire to provide a free demonstration version of the software to the consumer for trial use. In such a scenario, the consumer, as understood herein, can download the demonstration version at the kiosk and later try out the demonstration version away from the store. Using the kiosk for this purpose advantageously increases foot traffic in the store, while providing an easy, efficient, and low overhead way to get demonstration software into the hands of consumers.

If the consumer likes the software, he or she can then purchase the software over the Internet without returning to the store from which the demonstration version was obtained. The present invention critically recognizes, however, that it is possible under the above-discussed scenario that the Web site from which the full version is bought would have no way of knowing that the purchase was in response to the successful trial of demonstration software, much less the identity of the store at which the demonstration version was obtained. This represents a significant drawback from a sales and marketing viewpoint, because the efficacy of the demonstration version cannot be tracked and moreover the store that was responsible for providing the demonstration version that led to a sale cannot be given credit for the sale for revenue sharing purposes.

SUMMARY OF THE INVENTION

A method for vending software using a portable computing device includes wirelessly transmitting, from a kiosk to the device, a demonstration version of the software and at least some identifying data representing an identification of a store with which the kiosk is associated. The identifying data is sent to the server, which provides the full version of the software and which uses the identifying data to associate a sale credit with the store.

In a non-limiting embodiment the demonstration version is provided to the device when the device is disposed in the store, and the device is transported therefrom to a location remote from the store prior to receiving the software. The demonstration version can be transmitted to the device with or without user interaction, once the device is located in the store. Likewise, the preferred non-limiting download utility described below may be automatically transmitted from the kiosk to the device, or it may be transmitted to the device only upon a user request for the utility.

When the device is disposed in the store and includes the download utility, titles of software programs can be transmitted from the kiosk to the device and presented on a display of the device. A user of the device may select at least one of the titles to cause the kiosk to transmit a demonstration version of a selected title. The identifying data can be contained in a software agent downloaded to the device, and the agent is useful for accessing a Web site at which the software can be purchased. Or, the identifying data can be contained in an access code that is generated by combining a store identification and a software identification using an encryption protocol.

In another aspect, a method for vending software includes downloading a demonstration version of the software from a source located in a vending facility to a portable computing device, and also downloading indicating data indicating the vending facility along with the demonstration version. Sometime later, the indicating data is used to purchase the software.

In still another aspect, a kiosk has a processor that wirelessly transmits a demonstration version of software, with the demonstration version being receivable by a portable computing device. The kiosk also wirelessly transmits identifying data representing an identification of a store with which the kiosk is associated, and the identifying data is receivable by the device.

In yet another aspect, a portable computing device includes a download utility that is useful for the wireless reception, from a kiosk, of a demonstration version of software and identifying data representing an identification of a store with which the kiosk is associated. The device has code means for accessing a network server to purchase the software at least in part by uploading the identifying data to the server.

In another aspect, a network server includes code means for receiving a purchase request for software, and code means for receiving identifying data representing a store at which a demonstration version of the software had been wirelessly provided to a portable computing device. Code means are provided for executing a transaction for the software. Also, code means generate data that represents a sale credit to the store.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
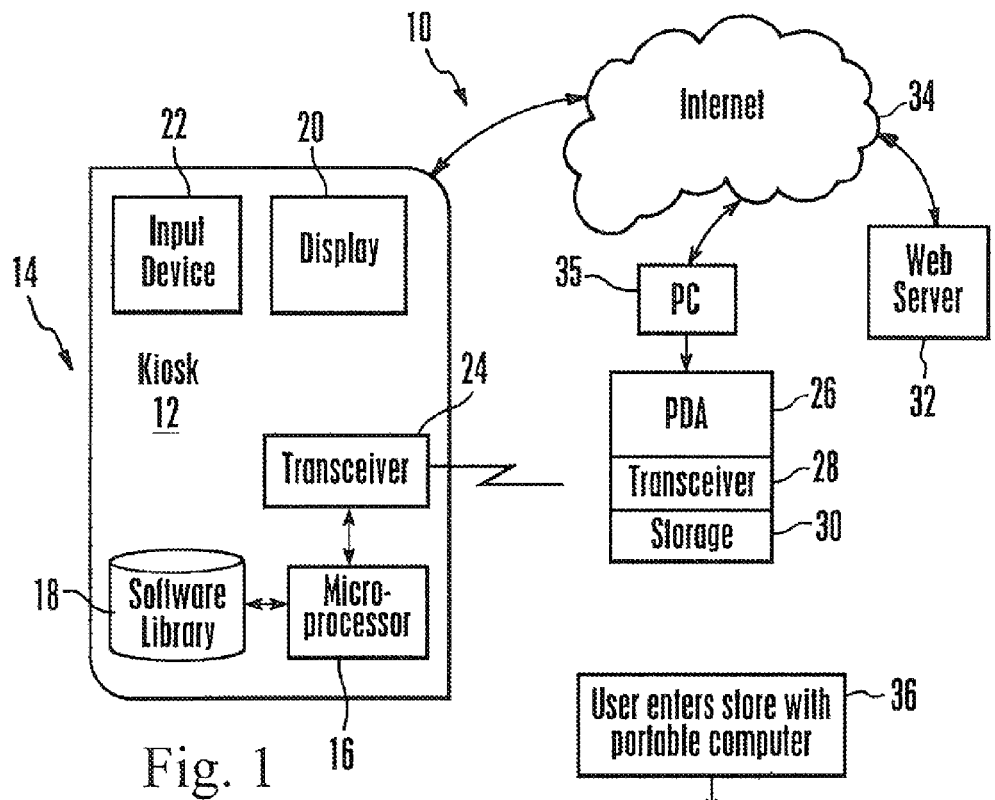
FIG. 1 is a block diagram of the architecture of the present invention.

Referring initially to FIG. 1, a system is shown, generally designated 10, that includes a computer kiosk 12 which is located in a retail store 14. The kiosk 12 can include a processor 16 and a software library 18 that contains demonstration versions of software and, if desired, full versions of the software. Software can be added to and updated in the library 18 from a server, such as the below-described Web server, that communicates with the kiosk 12 via wireless means (such as "Flexnet") or wired means such as Ethernet, or by engaging storage devices such as CDs and DVDs with the kiosk and loading the software from the storage devices into the library 18.

By "software" is generally meant a complete, fully enabled version of an application program that is to be purchased. On the other hand, by "demonstration" version is meant an ordinarily free, partial version of the software, with, e.g., many lines of code omitted so as to render the demonstration version only partially as capable as the software, or an ordinarily free, full version of the software, with portions of the full version disabled until such time as an enabling utility is obtained and used to enable the disabled portions. Accordingly, by "providing the software" is meant sending the complete, fully enabled version of the software to a recipient device, or sending the enabling utility to the recipient device, as appropriate.

The kiosk 12 also includes a display 20 such as a video monitor with speakers and a user input device 22 such as a keyboard, touchscreen, keypad, mouse, etc. Moreover, the kiosk 12 can include a transceiver 24 for transmitting data from the library 18 to a consumer's portable computer, such as a personal digital assistant (PDA) 26 or laptop. In the preferred embodiment, the transceiver 24 can be a wireless transceiver such as a Bluetooth™ transceiver. Other wireless principles can be used, such as CDMA, GSM, other types of RF or IR, etc., including a so-called "802.11" transceiver. In a less preferred embodiment, the transceiver 24 is a wired transceiver that requires physical engagement with the PDA 26 to transfer data. In any case, the processor 16 may execute an application that, among other things, maintains a count of how many demonstration versions have been downloaded to consumer devices, what the titles of the downloaded programs were, and when they were downloaded.

Turning to the PDA 26, it can be any appropriate laptop or hand-held computer, such as a Palm® OS-based device, a Sony Clie®, or other personal digital assistant (PDA). Or, the PDA 26 can be embodied in a wireless telephone.

As shown, the preferred PDA 26 includes a transceiver 28 that is configured to receive data from the transceiver 24 of the kiosk 12. Also, the PDA 26 can include one or more data storages 30, such as RAM, ROM, hard disk drives, floppy disk drives, CD drives, DVD drives, or removable media such as Sony Memory Stick® or SanDisk.

The system 10 further includes one or more Web servers 32, with all of the computers 12, 26, 32 preferably communicating with the Internet 34 or other wide area network. In an illustrative non-limiting embodiment, a personal computer 35 may be used as an interface between the PDA 26 and the Internet 34.

Figure 2:
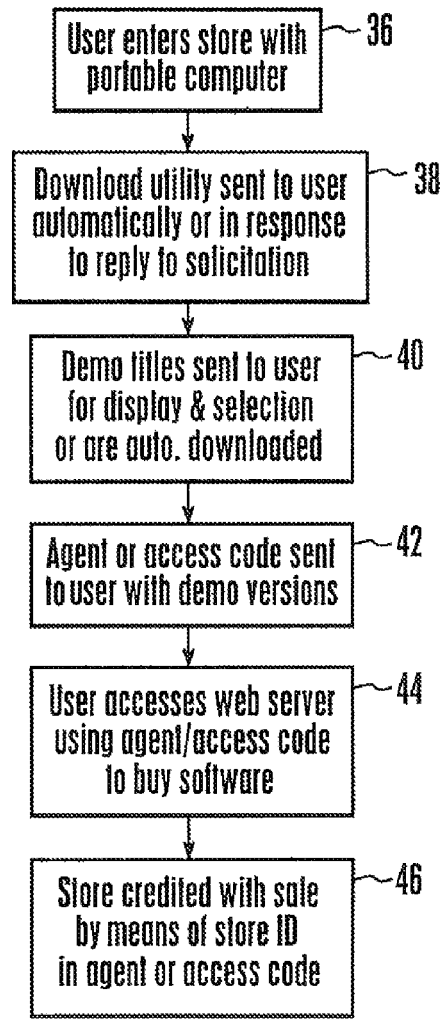
FIG. 2 is a flow chart of the logic of the present invention.

FIG. 2 shows the logic of the present invention. When the consumer or user enters the store 14 at block 36 with the PDA 26, if the computer 26 does not already have the necessary download utility, the download utility is transmitted from the kiosk 12 to the computer 26 at block 38 and stored in the storage 30 (e.g., on a Memory Stick®). The transmission can be automatically undertaken without user interaction, or a solicitation message can be transmitted from the kiosk 12 and presented on the computer 26 to prompt the user to accept the utility. The utility itself can be in the form of an applet that is automatically launched when the PDA 26 is booted up or when a removable memory such as a Memory Stick® containing the utility is inserted into the computer 26.

Once the PDA 26 has the download utility, the logic may proceed to block 40, wherein titles of demonstration versions of software in the kiosk 12 can be transmitted to the personal computer 26 for display thereof. Also, if desired titles of full versions available for purchase can be displayed. It is to be understood that while not the focus of the present invention, a consumer can purchase full versions of software in some implementations directly from the kiosk 12 in accordance with automatic vending principles known in the art using, e.g., the input device 22 on the kiosk 12.

Using the download utility of the PDA 26 the consumer may select one or more of the demonstration version titles from the list presented on the PDA 26. Alternatively, the list can be presented on the display 20 of the kiosk 12, and the consumer can select one or more titles using the input device 22. In either case, in response to the consumer's selection, one or more demonstration versions of software can be wirelessly transmitted free of charge from the kiosk 12 to the PDA 26 at block 40, using the download utility of the PDA 26. As another alternative, one or more demonstration versions can be automatically downloaded free of charge from the kiosk 12 to the computer 26 without consumer interaction, once the download utility is available to the computer 26. The demonstration versions if desired can be programmed with code restrictions on the number of uses of the versions, expiration time of the versions, conditional access to the versions, etc. The demonstration versions may be stored in the storage 30 (e.g., on a removable Memory Stick® or other flash memory).

As envisioned by the present invention, the kiosk 12 can periodically transmit a solicitation to the PDA 26 when the computer 26 is located in the store 14. For instance, every few seconds the kiosk 12 can broadcast a solicitation to any portable computer within the store 14, with the solicitation consisting of the above-discussed list of titles available for download, or a solicitation to download the download utility, or other information. Such solicitations can be done automatically or only when the consumer uses the download utility to transmit a request for solicitation to the kiosk.

Moving to block 42, in accordance with the present invention, data identifying the particular store 14 in which the kiosk 12 is located (or, equivalently, the identifying the kiosk 12 itself) is also downloaded to the computer 26, along with the demonstration software. If desired, store name and/or location and/or date/time/kiosk identification can be transmitted. In one non-limiting embodiment, the identifying data can be included in an access code that might be generated by combining a store identification, a software identification (representing the downloaded demonstration version), and if desired other identifications such as kiosk ID, using an encryption protocol such as MD-5. Thus, for each demonstration version that is downloaded, an access code representing the software and the store at which the version was downloaded is generated and maintained by the download utility. The access code is "n" characters long, and it is managed by and if desired stored with the download utility. In another non-limiting embodiment the identifying data and/or access code can be incorporated into a software agent that is downloaded to the PDA 26 for purposes to be shortly disclosed.

More specifically, the consumer can leave the store 14 and try out the demonstration version and, if he or she then desires to purchase the full version of the software (or equivalently a key to unlock the demonstration version if it is a partially disabled full version), the consumer can access the Web server 32 over the Internet at block 44 to request a purchase of the software. This access can be undertaken using the PDA 26 or using another computer to which at least the access codes and/or download utility/agent have been transferred, e.g., using a Memory Stick®. The access includes inputting to the server the access code associated with the demonstration version manually or automatically by means of the accessing download utility/agent.

When an agent embodies the store-identifying data, the agent, in conjunction with a Web browser of the PDA 26 (or other accessing computer that might be in communication with the storage 30), can automatically connect the computer 26 with the URL of the Web server 32, because the URL is known to the agent. The server 32 can then instruct the user of the computer 26 to use the download utility to enter the associated access code or other store-identifying information to the server 32, which stores the information and then executes a transaction for the software. The transaction itself can be done in accordance with Web software vending principles known in the art by redirecting the consumer to a transaction page.

When no agent is used, the download utility can be used in conjunction with the Web browser to connect to the Web server. In either case, as indicated at block 44, as part of the transaction the store-identifying information (e.g., the access code) is uploaded to the server 32, which uses the information (by, e.g., decrypting the access code to obtain both the software identification and store identification) at block 46 to generate a sale credit to the store 14 upon completion of the transaction for the full version (or unlocking key) of the software which is provided from the server 32 to the PDA 26.

It may now be appreciated that the above-described invention provides one or more of the following benefits. It requires minimal retail floor space, and the retailer need not maintain the kiosk. Rather, the kiosk can be maintained by the organization that provides the kiosk and that consequently might share in any revenue, along with the software producer, store, and software distributor, using the above-mentioned information that is recorded by the server 32. Software inventory holding costs are eliminated, as are commerce fees. The store 14 shares in the revenue that is generated by the ultimate sale of the software, and many hundreds or even thousands of software titles can be made available. The presence of the kiosk 12 also increases foot traffic in the store 14, thereby generating further sales for the store.

While the particular SYSTEM AND METHOD FOR WIRELESS SOFTWARE DOWNLOAD AND REMOTE TRANSACTION SETTLEMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A portable computing device, comprising:
   a processor configured to execute at least one download utility, the processor configured to wirelessly receive, from at least one kiosk, at least one demonstration version of software and identifying data of the demonstration version being a free, partial version of the software, with plural lines of code omitted or disabled so as to render the demonstration version only partially as capable as the software;
   the processor configured to access a network server to purchase the software at least in part by uploading the identifying data to the server; and further
   the processor configured to execute the demonstration version prior to purchase of the software to execute some functions of the software, the demonstration version not permitting the processor to execute all functions of the software prior to purchasing the software, the processor configured to receive a solicitation message from the kiosk, the processor configured to, responsive to the solicitation message, present on the computing device a prompt to accept the utility, the processor configured to download the utility responsive to user acceptance of the utility using the prompt.

2. The device of claim 1, wherein the utility is downloaded from the kiosk only in response to a transmission of a request for the utility using the prompt to accept the utility from the portable device.

3. The device of claim 1, wherein the demonstration version is received from the kiosk only upon transmission of a request therefor from the portable device.

4. The device of claim 1, wherein the demonstration version is received automatically from the kiosk, without a user generating a request therefor.

5. The device of claim 1, wherein the processor is configured to access the utility, and the identifying data received from the kiosk includes at least one access code.

6. The device of claim 5, wherein the access code is generated by combining a store identification and a software identification using an encryption protocol.

7. The device of claim 1, wherein the processor is configured to access an agent and the agent includes the identifying data.

8. The device of claim 1, wherein the solicitation message is received from the kiosk automatically without request from the device.

9. A portable computing device, comprising:

a processor configured to execute at least one download utility, the processor configured to wirelessly receive, from at least one kiosk, at least one demonstration version of software, the demonstration version being a free, partial version of the software, with plural lines of code omitted or disabled so as to render the demonstration version only partially as capable as the software;

the processor configured to access a network server to purchase the software at least in part by uploading identifying data received from the kiosk to the server; and further the processor configured to execute the demonstration version prior to purchase of the software to execute some functions of the software, the demonstration version not permitting the processor to execute all functions of the software prior to purchasing the software, the download utility being in the form of an applet configured to automatically launch when the portable computing device is booted up.

10. The device of claim 9, wherein the utility is received by the processor from the kiosk only upon transmission of a request therefor from the portable device.

11. The device of claim 9, wherein the demonstration version is received from the kiosk only upon transmission of a request therefor from the portable device.

12. The device of claim 9, wherein the utility is received automatically from the kiosk, without a user generating a request therefor.

13. The device of claim 9, wherein the demonstration version is received automatically from the kiosk, without a user generating a request therefor.

14. The device of claim 9, wherein the processor is configured to receive from the kiosk additional identifying data including at least one access code.

15. The device of claim 14, wherein the access code is generated by combining a store identification and a software identification using an encryption protocol.

16. The device of claim 9, wherein the processor is configured to access an agent and the agent includes the identifying data.

* * * * *